United States Patent Office 3,465,034
Patented Sept. 2, 1969

3,465,034
ADAMANTANE-1-CARBOXYLIC
ACID DERIVATIVES
André R. Gagneux and Franz Hafliger, Basel, Switzerland, assignors to Geigy Chemical Corporation, Greenburgh, N.Y., a corporation of Delaware
No Drawing. Filed Jan. 19, 1966, Ser. No. 521,556
Claims priority, application Switzerland, Jan. 20, 1965, 816/65
Int. Cl. C07c 101/36
U.S. Cl. 260—514                    3 Claims

ABSTRACT OF THE DISCLOSURE 3-amino adamantane-1-carboxylic acid and pharmaceutical addition salts thereof.

---

The present invention concerns new derivatives of adamantane-1-carboxylic acid which have pharmacologically valuable biological properties, and also relates to pharmaceutical agents which contain such new deriviatives as well as to a new method of controlling pathogenic virus.

It has surprisingly been found that the hitherto unknown 3-amino-adamantane-1-carboxylic acid and its pharmaceutically acceptable salts with inorganic and organic acids and bases, have excellent antiviral activity and, at the same time, relatively low toxicity. This indicates their suitability as active substances in agents for the treatment of virus disases such as various forms of influenza. Their pharmacologically valuable antiviral activity can be shown, e.g. on subcutaneous administration in the mouse, against the influenza A virus (PR 8) and against the Columbia SK virus.

The 3-amino-adamantane-1-carboxylic acid is produced by starting from the known 3-bromo-adamantane-1-carboxylic acid or 3-bromo-1-amino-adamantane, and which are converted by known methods to the amino acid mentioned above. A preferred process for the production of 3-amino-adamantane-1-carboxylic acid consists in reacting 3-bromo-adamantane-1-carboxylic acid in the presence of a strong acid with acetonitrile and hydrolysing the 3-acetamido-adamantane-1-carboxylic acid formed. In performing this process, concentrated sulfuric acid is added dropwise, e.g. at temperatures between about 0° and 50° C., to a suspension of the above acid in acetonitrile and the reaction is completed by stirring at temperatures of from about 40° C. to the boiling temperature of acetonitrile. Instead of excess acetonitrile, an inert organic solvent such as cyclohexane can also be used as reaction medium. The hydrolysis of the resulting acetamido compound can be performed in aqueous-acid medium, e.g. by boiling in concentrated aqueous hydrochloric acid; it can also be performed in aqueous-organic alkaline meduim, e.g. with aqueous sodium hydrovide solution in ethylenet glycol.

New pharmaceutical agents according to the invention for the control of pathogenic virus, and especially for the treatment of virus diseases contain antivirally effective doses of 3-amino-adamantane-1-carboxylic acid or pharmaceutically acceptable salt thereof as active substance in a form suitable for oral, rectal, local or parenteral administration. Pharmaceutically acceptable salts are those with inorganic and organic acids and bases, which themselves have no physiological action in the usual dosages or, preferably have a desirable action, e.g. an antibacterial action or particularly in the case of forms for parenteral administration, a local anesthetic action.

Examples of pharmaceutically acceptable salts with acids, suitable as active ingredients in agents according to the invention are salts with hydrochloric acid, hydrobromic acid, sulfuric acid, phosphoric acid, methane sulfonic acid, ethane sulfonic acid, β-hydroxyethane sulfonic acid or strong carboxylic acids. Suitable salts with bases are, e.g. sodium, potassium, magnesium, calcium and ammonium salts as well as salts with strong organic bases.

For adults of normal weight, suitable daily dosages of 3-amino-adamantane-1-carboxylic acid and its salts for the treatment of virus diseases lie betwen 10 mg. and 1000 mg. Within these margins, the dosages for parenteral administration are, in general, lower than those for oral administration. Advantageously, these daily dosages are administered in forms containing 5 to 250 mg. of active substance per dosage unit, but also corresponding amounts can be administered in the form of syrups, sprays, aerosols, powders or ointments.

Dosage units for oral administration preferably contain betwen 1% and 90% of 3-amino-adamantane-1-carboxylic acid or a pharmaceutically acceptable salt thereof as active ingredient. They are produced by mixing the active substance with, e.g., solid, pulverulent carriers such as lactose, sucrose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowax) of suitable molecular weights and pressing the mixture into tablets or dragee (sugar-coated tablet) cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active ingredient.

Example of dosage units for rectal administration are suppositories which consist of a combination of 3-amino-adamantane-1-carboxylic acid or a suitable non-toxic salt thereof with a neutral fatty base, or also gelatin rectal capsules which contain a combination of the active substance or a suitable salt thereof with polyethylene glycols (Carbowax) of suitable molecular weight.

Ampoules for parenteral, particularly intravenous, intramuscular or subcutaneous administration, contain 3-amino-adamantane-1-carboxylic acid or a water soluble, non-toxic salt thereof in a concentration of, preferably, 0.5–10%, optionally together with suitable stabilising agents and buffer substances, in aqueous solution.

Other forms for administration, particularly for the treatment of virus infection of the air passages, are syrups and also aerosols and, for local treatment of virus diseases, ointments and powders. All these forms for administration can be prepared with the use of the carriers, diluents and additives usual for this purpose.

The following examples illustrate the production of 3-amino-adamantane-1-carboxylic acid as well as that of tablets and dragees containing it. The temperatures are given in degrees centigrade.

EXAMPLE 1

(a) 115 ml. of concentrated sulfuric acid are added dropwise at 23° to a suspension of 75.0 g. (290 millimol) of 3-bromo-adamanane-1-carboxylic acid (H. Stetter & J. Mayer, Chem. Ber. 95,667 (1962) in 565 ml. of acetonitrile freshly distilled over phosphorus pentoxide, whereupon the temperature of the reaction mixture rises to 40°. After the mixture has been stirred for half an hour, it is refluxed for 1 hour whereupon a clear solution is formed which gradually becomes red. The reaction solution is cooled to room temperature and poured onto about 1 kg. of ice. The volume is then reduced to 500 ml. by heating at 60° and the white substance which precipitates is separated by suction filtration. The filter residue is dissolved in a mixture of 35 ml. of concentrated aqueous sodium hydroxide solution and 400 ml. of water, active charcoal is added to the solution which is filtered through Hyflo and finally the reaction product is again precipitated by the addition, while stirring, of 1 N hydrochloric acid and filtered off. By recrystallization from glacial acetic acid/acetone (volume ratio 1:1), pure 3-acetoamido-adamantane-1-carboxylic acid is obtained, M.P. 249–253°.

(b) 10 g. (42 millimol) of 3-acetamido-adamantane-1-carboxylic acid in 200 ml. of concentrted aqueous hydrochloric acid are refluxed for 48 hours. The reaction mixture is then diluted with 500 ml. of water, cooled in an icebath, precipitated starting material is filtered off and the filtrate is evaporated to dryness. The residue is stirred for 2 hours with 40 ml. of saturated sodium bicarbonate solution and then quickly separated by suction filtration. The filter residue is slurried in 20 ml. of water, the suspension is stirred for 30 minutes and filtered. The 3-amino-adamantane-1-carboxylic acid obtained is dried over phosphorus pentoxide. It does not melt on heating to 300°.

To prepare the hydrochloride thereof, the stoichiometric amount of hydrochloric acid is added to the 3-amino-adamantane-1-carboxylic acid in aqueous solution and the solution is evaporated. The hydrochloride also does not melt below 300°.

The following characteristic bands are to be found in the infra red spectra (in Nujol) of the free acid (hybrid ion) and of the hydrochloride:

Hybrid ion:
- 2800–2000 cm.$^{-1}$ ⎫
- 1640–1535 cm.$^{-1}$ ⎬  —$NH_3^+$
- 1520–1490 cm.$^{-1}$ ⎭
- 1610–1550 cm.$^{-1}$   —$COO^-$
- 2680    cm.$^{-1}$   (weak) adamantane band Hydrochloride:
- 1690 cm.$^{-1}$   —COOH
- 2680 cm.$^{-1}$   (weak) adamantane band In the NMR spectrum (about 10% solution in about 1 N $NaOD/D_2O$, thereis a broad multiplet at $\tau=7.88$ with relative intensity 2, corresponding to the two tertiary (angular) hydrogen atoms and a broad multiplet at $\tau=8.23-8.60$ with 4 maxima at $\tau=8.31$, 8.35, 8.44 and 8.50 with relative intensity 12, corresponding to the hydrogen atoms of the six methylene groups.

EXAMPLE 2

A granulate is prepared from 250 g. of 3-amino-adamantane-1-carboxylic acid, 175.90 g. of lactose and an ethanolic solution of 10 g. of stearic acid. After drying, the granulate is mixed with 56.60 g. of colloidal silica, 165 g. of talcum, 20 g. of potato starch and 250 g. of magnesium stearate and pressed into 10,000 dragée cores. These are then coated with a concentrated syrup of 502.28 g. of crystallized sucrose, 200 g. of talcum, 6 g. of shellac, 10 g. of gum arabic, 0.22 g. of dyestuff and 1.5 g. of titanium dioxide and dried. The dragées obtained each weigh 140 mg. and contain 25 mg. of active substance.

EXAMPLE 3

250 g. of 3-amino-adamantane-1-carboxylic acid are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silica are mixed in and the mixture is pressed into 10,000 tablets each weighing 100 mg. and containing 25 mg. of active ingredient. If desired, the tablets can be grooved for subdividing the dosage.

We claim:
1. A compound selected from the class consisting of 3-amino-adamantane-1-carboxylic acid, a pharmaceutically acceptable addition salt thereof with an acid, and a pharmaceutically acceptable salt thereof with a base.
2. A compound selected from the class consisting of 3-acetamido-adamantane-1-carboxylic acid and a pharmaceutically acceptable salt thereof with a base.
3. A compound according to claim 1 which is 3-amino-adamantane-1-carboxylic acid.

References Cited

Chemical Abstracts 65: 627 d & e 1966.

LORRAINE A. WEINBERGER, Primary Examiner

PAUL J. KILLOS, Assistant Examiner

U.S. Cl. X.R.

260—501.11, 501.12; 424—319